UNITED STATES PATENT OFFICE.

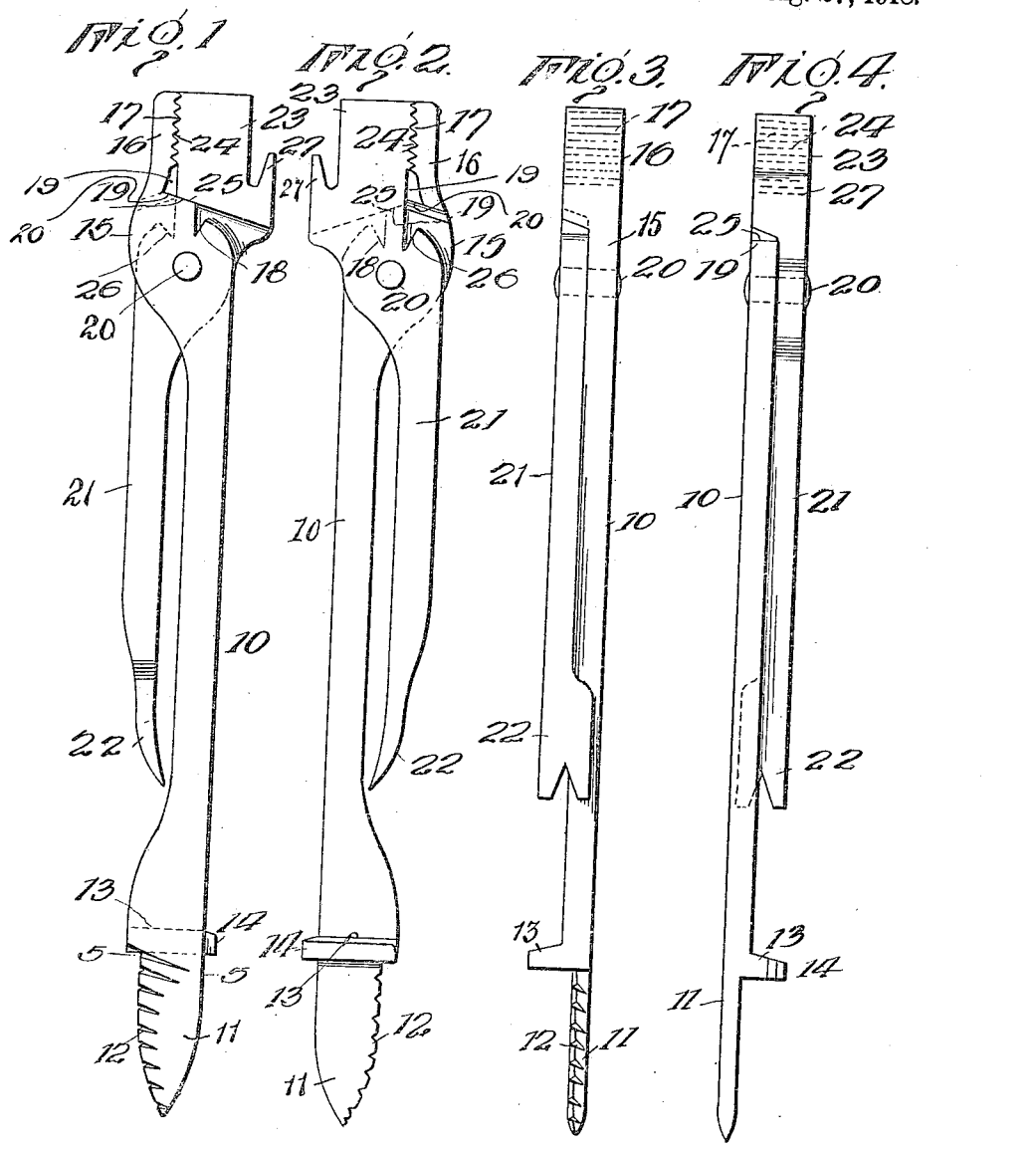

FRANK F. RIGGS, OF LEAD, SOUTH DAKOTA.

COMBINATION IMPLEMENT.

1,276,960. Specification of Letters Patent. Patented Aug. 27, 1918.

Application filed July 13, 1916. Serial No. 109,079.

*To all whom it may concern:*

Be it known that I, FRANK F. RIGGS, a citizen of the United States, residing at Lead, in the county of Lawrence and State of South Dakota, have invented certain new and useful Improvements in Combination Implements, of which the following is a specification.

This invention relates to improvements in a device in which various implements are embodied and arranged in coactive relation, and has for one of its objects to simplify and improve the construction and increase the efficiency and utility of devices of this character.

Another object of the invention is to provide an implement whereby a strip of material, a wire or the like of any length may be bent at an angle at any point or at a plurality of points intermediate the ends or at opposite angles.

With these and other objects in view the invention consists in certain novel features of construction, as hereinafter shown and described and then specifically pointed out in the claim; and in the drawings illustrative of the preferred embodiment of the invention—

Figures 1 and 2 are side elevations of the improved implement viewed from its opposite sides;

Fig. 3 is an edge view of the improved implement viewed from one side, and

Fig. 4 is a similar view from the opposite side;

Fig. 5 is a transverse section on the line 5—5 of Fig. 1.

Corresponding and like parts are referred to in the following description and indicated in all the views of the drawings by the same reference characters.

The improved implement comprises a stock or body 10 pointed at one end, as shown at 11, to form a can-opener with one edge of the pointed portion "knife-edged" and preferably with a plurality of elongated V-shaped recesses or grooves 12 to produce a saw-like outline in the sharpened edge, to increase the efficiency of the implement. At the juncture of the pointed portion 11 and the stock 10 a lateral projection 13 is formed which extends at one end, as shown at 14, beyond the rear face or edge of the stock and of the pointed terminal. The projection 13 forms a lateral stop or shoulder to limit the insertion of the implement in the cover of the can which is being opened, while the projection 14 serves as a fulcrum to enable the implement to be used as a cutting lever in opening the can. The efficiency of the implement is thereby materially increased.

At the end of the stock 10 opposite to the reduced cutting member 11 the stock is enlarged, as shown at 15, and extended at one edge into a jaw portion 16 having a plurality of teeth 17, the teeth extending only a portion of the length of the jaw, as shown in Figs. 1 and 2. The enlargement 15 is provided with a V-shaped notch 18 and the enlargement extended at one side of the notch to form a gripping shoulder 19, the gripping shoulder being nearly at right angles to the jaw portion 16. Pivoted at 20 to the enlargement 15 of the stock is a movable member 21 extended at one end into a tack pulling claw 22 and provided at the opposite end with an enlarged head portion 23, the latter having teeth 24 in one edge corresponding to and engaging with the teeth 17 of the jaw 16, the two sets of teeth interengaging when the device is in closed position, as shown in Figs. 1 and 2, the members 10—21 corresponding in thickness while the jaws 16—23 are enlarged laterally to equal in width the combined thickness of both of the members 10—21. The jaw 23 is provided at its inner end with a lateral gripping shoulder 25 coacting with the gripping shoulder 19 of the member 10 with its gripping face extending nearly at right angles to the jaw face 24. The contiguous faces of the shoulders 19—25 extend obliquely to the longitudinal axis of the members 10—21 and coact to form an effectual holder which may be utilized to firmly grip an object between them. The shoulders 19—25 likewise coact with the jaw face 17—24 to bend an object such as a wire or strip at an angle at any point intermediate the ends or at numerous points as may be preferred. The member 21 is provided with a V-shaped notch 26 corresponding to and coacting with the notch 18 to form an effectual wire cutting device.

The enlargement 15 is cut away externally of the notch 18, so that access to the shoulders 19—25 is unobstructed. Thus, wires, strips, or the like of any length may be inserted to any required extent when the members 10—21 are separated and bent at any point intermediate the ends, or at numerous points as before stated. The jaws 16—23 thus coact with the shoulders 19—25 to produce the desired result.

Projecting from the edge of the head member 23 opposite to the teeth 24 is a projection or lip 27 which forms an effectual plate or utensil lifter, and may be likewise employed as a stove lid lifter. The coacting gripping jaws 19—25 also provide an efficient and convenient means for holding an article such as small wires, flat strips, plates or the like, and by reason of the arrangement and form of the jaws a very powerful leverage may be produced to hold the article by moving the member 21 toward the member 10. The member 10 is provided with a recess 19' extending uninterruptedly across the entire face of the jaw 16 and defining a stop shoulder 20', said stop shoulder gradually merging into the gripping shoulder 19 as shown. Thus when the device is used for bending wire the opening 19' provides an open space at the point where the elbow is to be formed in the wire so that the bent wire is not unduly compressed at the bend which would otherwise have a tendency to fracture the wire.

The implement may be constructed of any suitable material, preferably of steel, and may be inexpensively manufactured and with a minimum of machine work in assembling the parts.

Having thus described the invention, what is claimed as new is:

A tool comprising pivotally connected members constructed at one side of their pivotal connection with longitudinal opposed jaws and laterally extended whereby the entire inner surface of each jaw is opposed to and adapted to coöperate with the entire inner surface of the other jaw, one of the jaws having a transverse stop shoulder at its inner extremity and a transverse recess in its face at the junction of the same with said transverse stop shoulder and a gripping shoulder extending angularly from one end of said transverse stop shoulder, and the other jaw being provided on one side with a lateral gripping shoulder overhanging and coöperating with the first-mentioned gripping shoulder.

In testimony whereof I affix my signature.

FRANK F. RIGGS.

Copies of this patent may be obtained for five cents each, by addressing the "Commissioner of Patents, Washington, D. C."